(12) United States Patent
Logounov

(10) Patent No.: US 9,493,197 B2
(45) Date of Patent: Nov. 15, 2016

(54) AERODYNAMIC TRACTOR-TRAILER WIND FAIRING THAT IMPROVES OPERATING FUEL ECONOMY

(71) Applicant: Nikolai Logounov, Concord, CA (US)

(72) Inventor: Nikolai Logounov, Concord, CA (US)

( * ) Notice: Subject to any disclaimer, the term of this patent is extended or adjusted under 35 U.S.C. 154(b) by 0 days.

(21) Appl. No.: 15/066,869

(22) Filed: Mar. 10, 2016

(65) Prior Publication Data
US 2016/0194037 A1    Jul. 7, 2016

(51) Int. Cl.
*B62D 35/00* (2006.01)
(52) U.S. Cl.
CPC .................... *B62D 35/001* (2013.01)
(58) Field of Classification Search
CPC ..................................... B62D 35/001
USPC ........................................ 296/180.2
See application file for complete search history.

(56) References Cited

U.S. PATENT DOCUMENTS

| 6,793,273 B1 * | 9/2004 | Tuerk | B60J 7/062 296/180.1 |
| 8,506,004 B1 * | 8/2013 | Vogel | B62D 35/001 296/180.1 |
| 9,079,622 B2 * | 7/2015 | Gan | B62D 35/001 |

* cited by examiner

*Primary Examiner* — Pinel Romain
(74) *Attorney, Agent, or Firm* — Richard B. Main; Main Law Cafe

(57) ABSTRACT

A tractor-trailer wind fairing panel assembly includes two side and one top fairing panels that mount to a truck tractor and aerodynamically bridge the air gap to any fifth-wheel utility trailer being pulled by the tractor. Such fairing panels are hinged on their leading edges so their distal trailing edges can swing a bit to accommodate twisting and turning of the utility trailer during use. The hinges all mount to a cab adapter collar that helps fit the whole to the contoured surfaces of the rear of a typical truck tractor cab. The distal ends of the trailing edges are fitted with inward directed wind seals. Rows of ball bearing pucks are arranged in the crowns of the inward directed wind seals to reduce friction and wear as the fairing panels swing to accommodate the twisting and turning of the utility trailer.

4 Claims, 8 Drawing Sheets

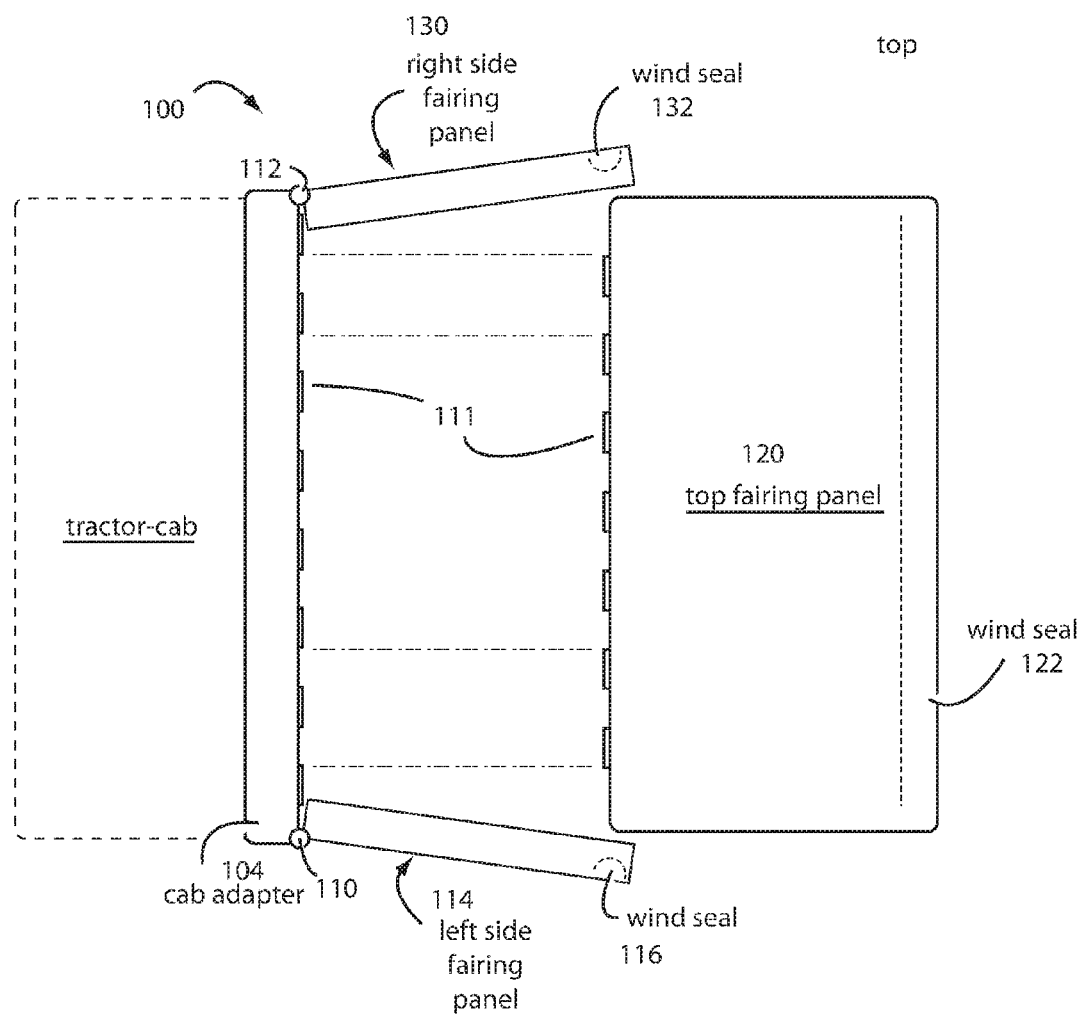

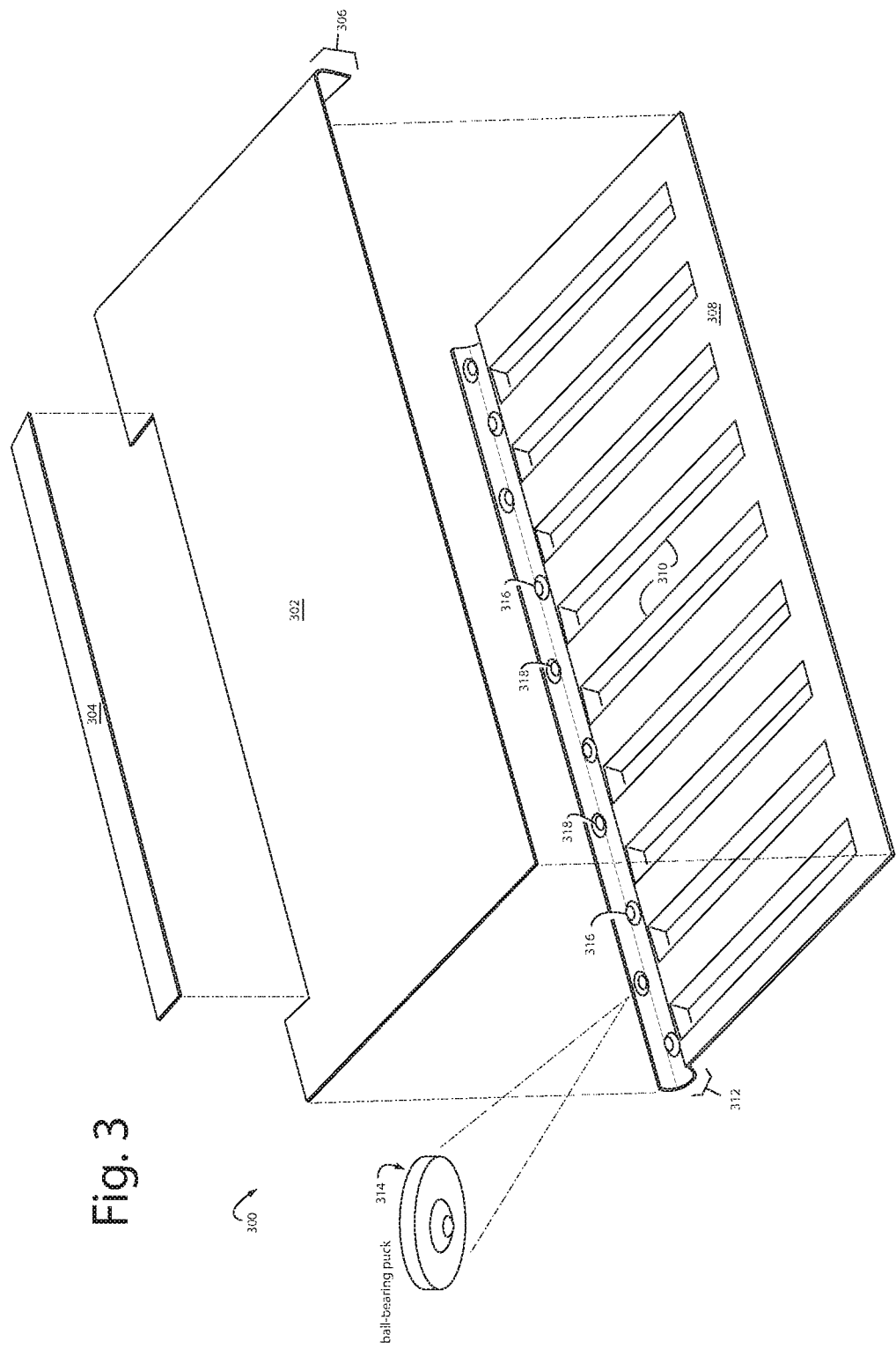

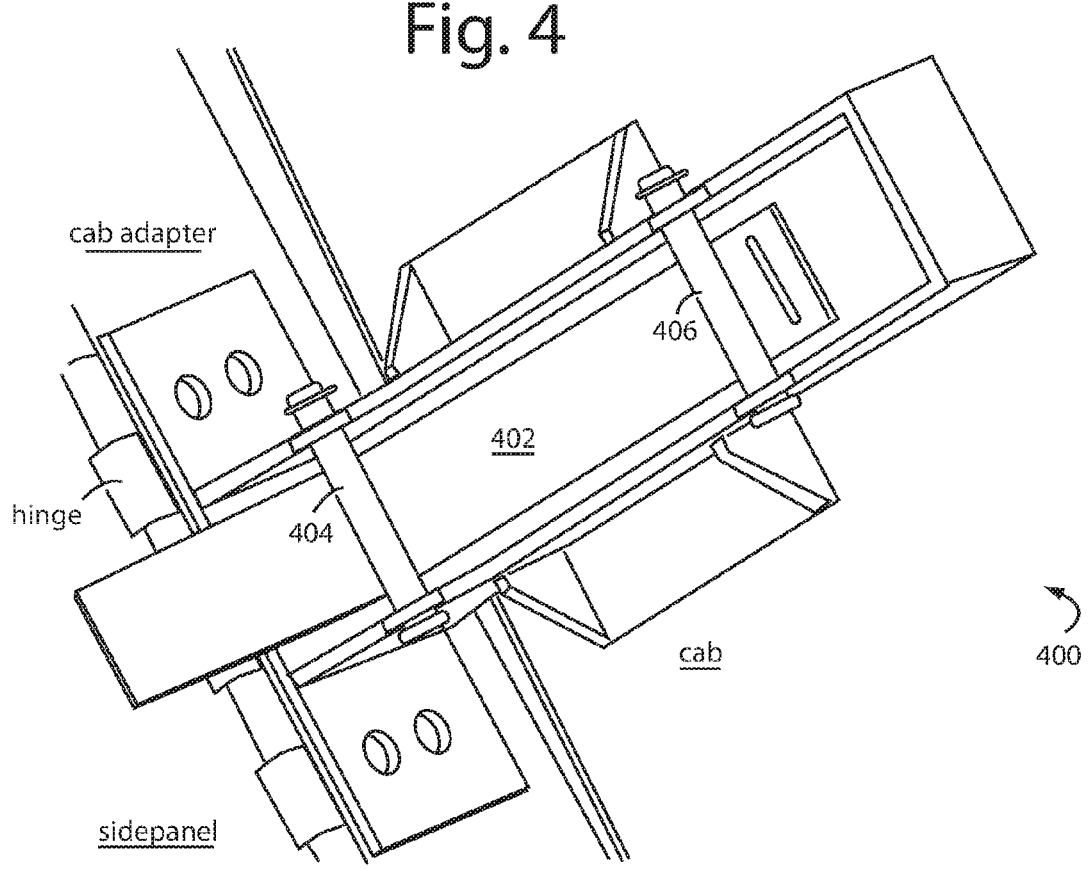

AERODYNAMIC TRACTOR-TRAILER WIND FAIRING THAT IMPROVES OPERATING FUEL ECONOMY

1. FIELD OF THE INVENTION

The present invention relates to methods and devices to improve the operating fuel economy of tractor-trailers operated on highways, and more specifically to practical and lightweight wind fairing panels that aerodynamically eliminate turbulence and air drag by bridging the gaps between the rear of tractor cabins and the noses of the trailers the tractors pull.

2. DESCRIPTION OF THE PRIOR ART

It is generally understood that tractor-trailer combinations create a lot of wind turbulence and air drag as they move at speed down highways across American highways. Natural Resources Canada (NRC) estimated in 2010 that given 100% of fuel energy, 50% is lost in heat rejection and exhaust heat. Of the 50% left, 42% is lost in braking power, 22.3% in aerodynamic drag, 13.4% in rolling resistance, etc. So the elimination or reduction in aerodynamic drag can result in substantial savings of fuel energy.

Aerodynamic drag cannot be eliminated entirely, but significant fuel savings can be obtained by the careful placement of chassis skirts, side extenders, roof fairing panels, wheel covers, and spoilers about both the tractor and trailer and the coupling area between them.

A typical commercial truck-tractor in the United States is usually driven about 12,000 miles a month on average. Any less than that its operation will not be profitable. The average fuel economy for semi-trucks is about six miles-per-gallon. On average, such trucks consume 2,000 gallons of diesel fuel each month. The cost of diesel has been very high lately. The amount of fuel consumed by the entire trucking industry is staggering. By one estimate, there are fifteen million trucks travelling on American highways.

A change is needed in making our use of fuel more efficient.

One day watching how a truck with a manufacturer-installed gap spoiler was doing at parking up to a loading dock, the driver made too sharp a turn and busted the spoiler. Closing the tractor-trailer gap completely seemed to be a superior idea, if it could be accomplished. Aerodynamically it would make a tractor and its trailer one continuous whole. The secondary air pressure on the front of the trailer could be reduced or nearly eliminated.

Reducing the trailer's wind resistance will reduce the amount of energy required to run at highway speeds. The amount of fuel consumed would be less, significantly less. Lower expenses on fuel would indirectly benefit the Economy and everyone of us. Moreover, using less fuel helps to better preserve our Environment because fewer pollutants and other particles are released into the atmosphere.

SUMMARY OF THE INVENTION

Briefly, a tractor-trailer wind fairing panel assembly embodiment of the present invention comprises two side and one top fairing panels that independently mount to a truck tractor and bridge the air gap to any fifth-wheel utility trailer being pulled by the tractor. Such fairing panels are each hinged on their leading edges so their distal trailing edges can swing a bit to accommodate the twisting and turning of utility trailers during use. The hinges all join to a cab adapter collar that helps fit the whole to the contoured surfaces of the rear of a typical truck tractor cab. The distal ends of the trailing edges are fitted with inward directed wind seals. Rows of ball bearing pucks are arranged on the crowns of the inward directed wind seals to reduce friction and wear as the fairing panels slide on the trailer sides to accommodate the twisting and turning of the utility trailer.

These and other objects and advantages of the present invention no doubt become obvious to those of ordinary skill in the art after having read the following detailed description of the preferred embodiments which are illustrated in the various drawing figures.

IN THE DRAWINGS

FIG. 1 is an exploded assembly view in above-right-rear perspective of a tractor-trailer wind fairing panel assembly embodiment of the present invention;

FIGS. 2A-2E provide further detailed views of the pieces of the tractor-trailer wind fairing panel assembly of FIG. 1;

FIG. 2C shows the tractor-trailer wind fairing panel assembly from the top with the truck-tractor facing left in the drawing;

FIG. 3 is an exploded assembly view drawing of an alternative construction for a side fairing panel with the corner cover integrated into the outer skin. Two rows of ball bearing pucks are disposed in a wind seal channel that is covered by an access plate;

FIG. 4 is a perspective view diagram of a spring bracket used to mount the assembly of FIG. 1 to the tractor can and that controls the side panel swings.

DETAILED DESCRIPTION OF THE PREFERRED EMBODIMENT

Figure 1:
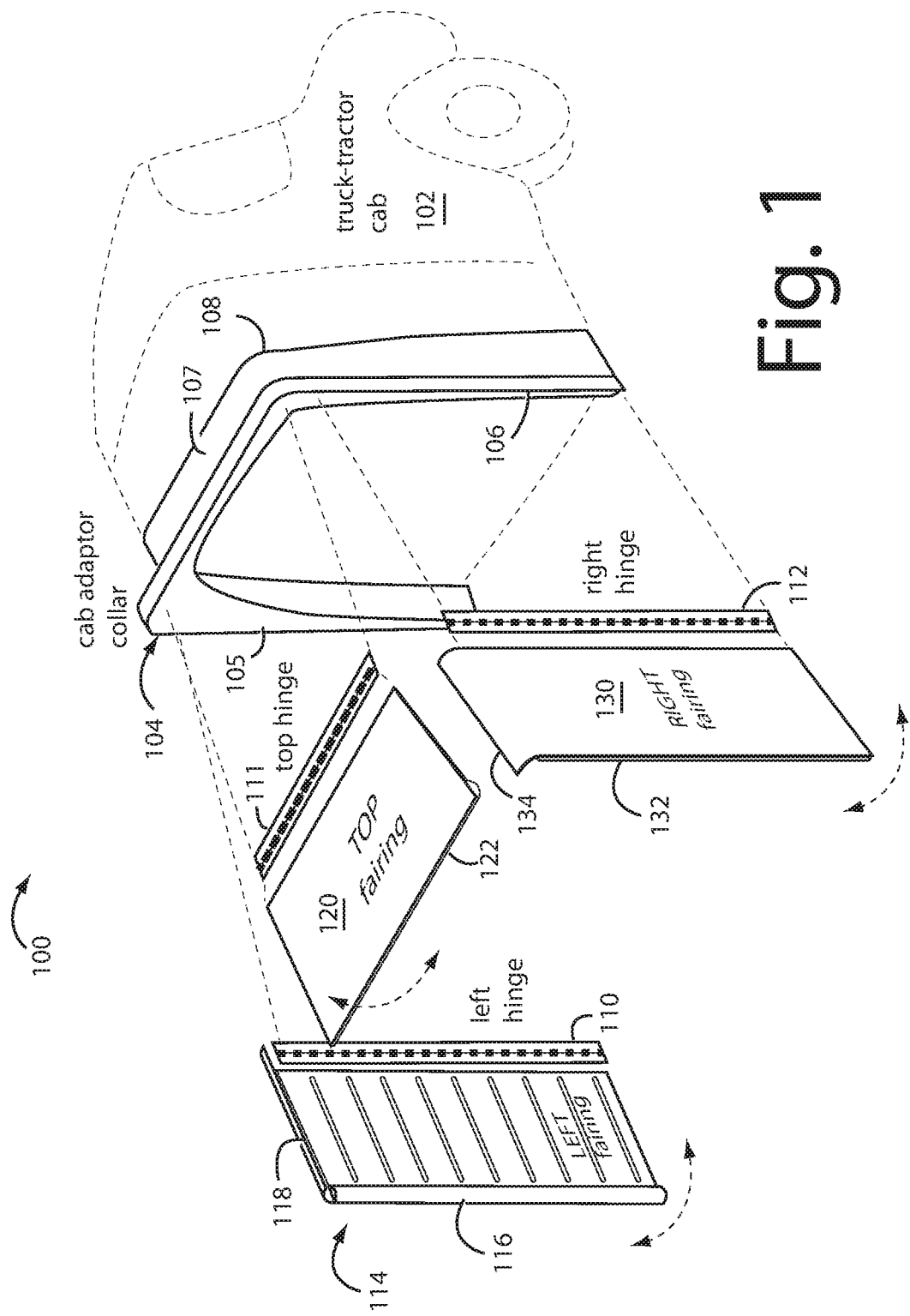

FIG. 1 represents a tractor-trailer wind fairing panel assembly 100 that aerodynamically bridges the air gap between the rear cab of a truck-tractor 102 and the front flat nose of its fifth-wheel type trailer. The object of which is to make the tractor-trailer combination more aerodynamic, reduce air drag, and yield fuel savings at highway speeds.

The tractor-trailer wind fairing panel assembly 100 comprises a cab adapter collar 104 having vertical left and right side lengths 105, 106 and an inter-connecting horizontal top length 107. Such cab adapter collar 104 is typically one hundred seventeen inches tall, ninety three inches wide, and at least six inches thick. The cab adapter collar 104 is contoured on its front face 108 in a way that matches the contours of a rear outer periphery of a drivers cab of a particular type of truck-tractor 102. A set of left, top, and right continuous hinges 110-112 are correspondingly disposed vertically in each of a rear face of each the left and right side lengths 105, 106, and horizontally in a rear face of the inter-connecting top length 107.

A left fairing panel 114 is vertically hinged to the left length 105 of the adapter collar 104 at its rear face, and is supported by the corresponding continuous hinge 110. A distal vertical edge with a wind seal 116 is free to swing left-right within a limited range. For example, to accommodate a typical fifth-wheel type trailer one hundred and eight inches wide. During use, such distal vertical edge at wind seal 116 is kept closed up against the front nose of the fifth-wheel type trailer by a heavy spring, e.g., in continuous hinge 110. Such wind seal 116 slides fore-and-aft as the tractor-trailer combination makes left and right turns. The left fairing panel 114 has at its top edge an inwardly curled lip, e.g., a corner cover 118 to wind seal that corner edge with the adjacent edge of a top fairing panel 120.

Conventional fifth-wheel type utility trailers are usually wider abeam and taller than the rear of popular types of truck-tractor cabs 102. So, in normal operation the three fairing panels of tractor-trailer wind fairing panel assembly 100 on the whole will be flared out a bit toward the trailer. For example, flaring in width from 94" to 108".

The top fairing panel 120 has a straight rectangle shape, not trapezoid. Such is needed in order for the top fairing panel 120 to be able to fold completely down between hinges 110 and 112 during storage. The leading edge of top fairing panel 120 is attached by top hinge 111 to the horizontal rear face of the inter-connecting top length 107. A distal horizontal edge is kept closed down to form a wind seal 122 down against the top of the front nose of the fifth-wheel type trailer. Such wind seal 122 twists, rotates, and slides around as the tractor-trailer combination makes left and right turns and goes up and down bumps and dips in the road.

A pair of gas charged piston lifts allow the user to position top fairing panel 120 at various elevations. See FIG. 2B. For example, to enable positioning of the top fairing panel 120 and wind seal 122 to just clear the top edge of the front nose of the fifth-wheel type trailer during its coupling to the truck-tractor.

A right fairing panel 130 is vertically hinged to the right length 106 of the adapter collar 104 at its rear face, and is attached by corresponding continuous hinge 112. A distal vertical edge with a wind seal 132 is free to swing left-right within a limited range. During use, such distal vertical edge 132 is kept closed up against the front nose of the fifth-wheel type trailer by a heavy spring, e.g., incorporated within continuous hinge 112. This wind seal 132 too twists, and slides fore and aft as the tractor-trailer combination makes left and right turns and maneuvers the road. The right fairing panel 130 has at its top edge an inwardly curled lip 134 to seal out wind at that corner edge with the adjacent edge of top fairing panel 120.

Nothing of tractor-trailer wind fairing panel assembly 100 needs to be mounted to the utility trailer. This is an advantage because utility trailers belonging to large hiring companies can be freely mixed and matched to the truck-tractors of independent owner-operators. The aerodynamic fuel savings stay with the truck-tractors of their independent owner-operators.

Set of brackets and springs are conventionally arranged to press the distal edges of the left, right, and top fairing panels against any trailer coupled to the particular type of truck-tractor. Here, these are further arranged to limit the inward swings of each of the left, right, and top fairing panels to no less that that needed for any trailer coupled to the particular type of truck-tractor to press itself in between the distal ends while coupling.

Figure 2A:
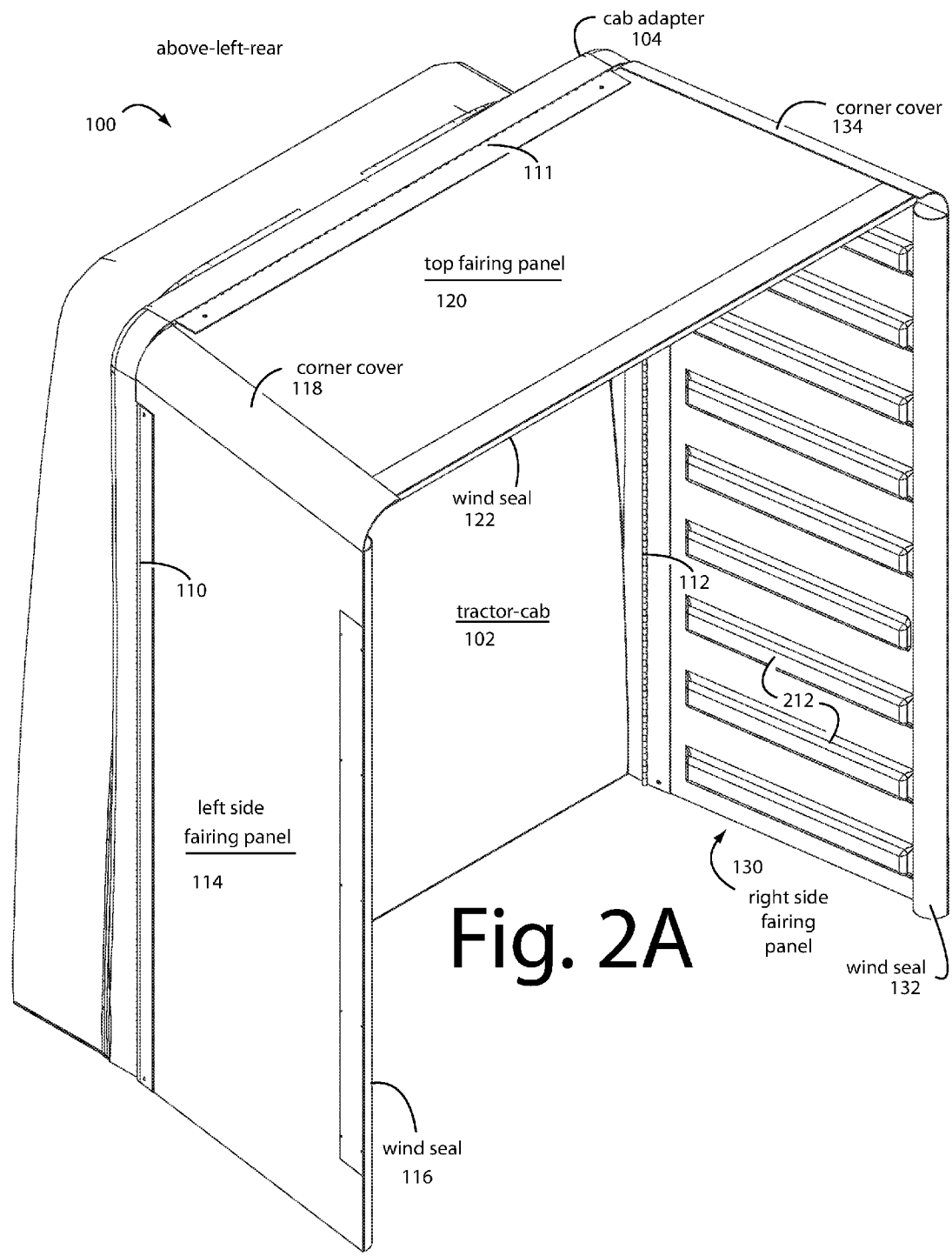
FIG. 2A shows the tractor-trailer wind fairing panel assembly as assembled from above-left-rear perspective.

FIG. 2A shows an assembled tractor-trailer wind fairing panel assembly 100 mounted to the backside of a tractor-cab 102.

The top fairing panel 120 represents a special case in that it must be held aloft high enough during tractor coupling to the trailer that the top fairing panel's horizontal distal edge can ride up over the top of the nose of the trailer without interference or damage. The top fairing panel 120 must also be able to fold down flat enough against the rear of the tractor cab such that the two side fairing panels can be folded over it for secure storage.

Figure 2B:
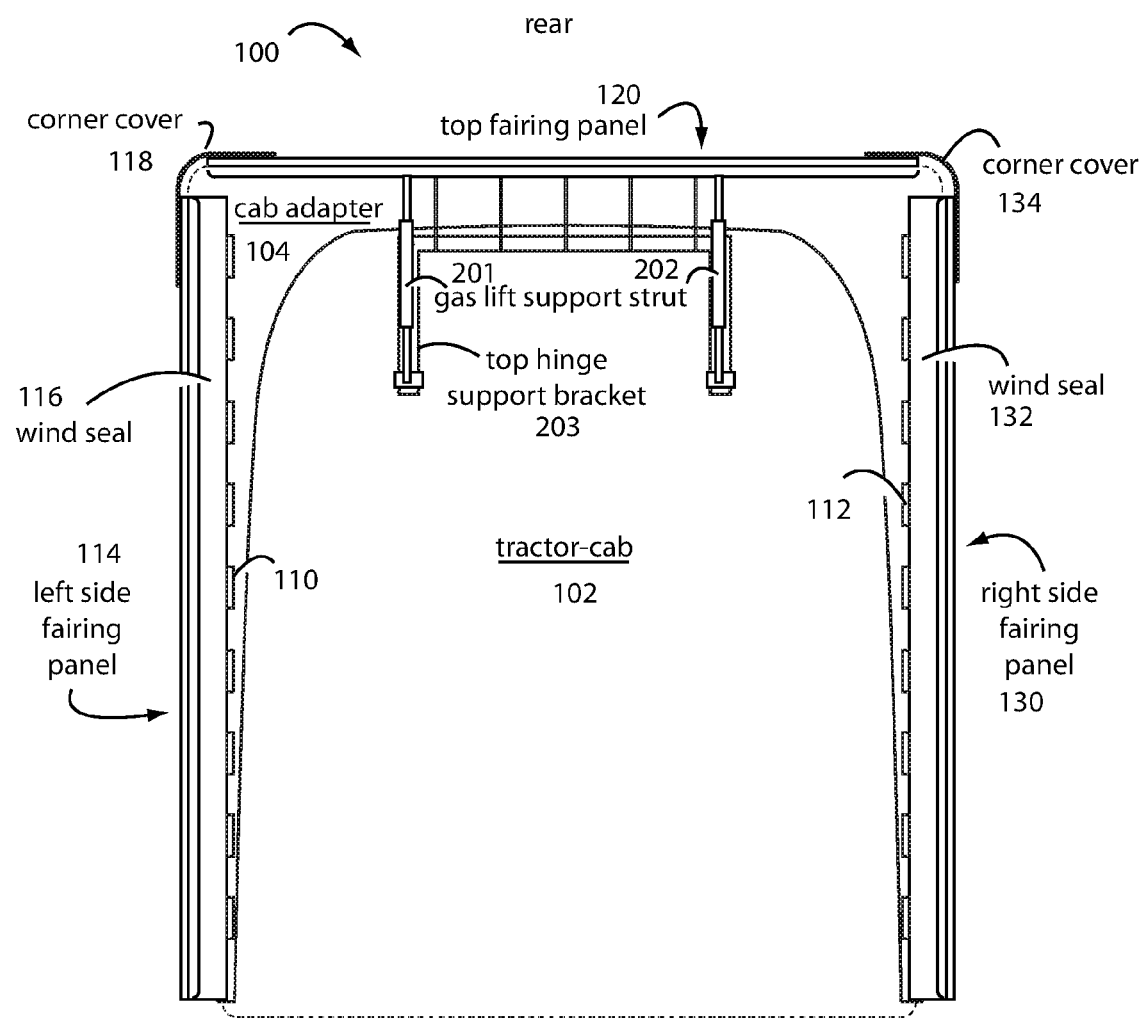
FIG. 2B shows the tractor-trailer wind fairing panel assembly from the rear as viewed from a utility trailer attached to the truck-tractor.

FIG. 2B alone shows how two gas lift support struts 201 and 202 are attached to the bottom outside pivot points of a top hinge support and bracing bracket 203. Bracket 203 bolts to the tractor-cab 102 at the center and provides a shelf to support the forward fixed part of top hinge 111 and the whole of cab adapter 104. The two gas lift support struts 201 and 202 are very similar to those used to support opening and closing tailgates and hoods in common SUV's, only heavier duty, and attach up under top fairing panel 120. They completely counter-balance the weight of top fairing panel 120 and make it easy for a user to raise and lower top fairing panel 120.

Figure 2D:
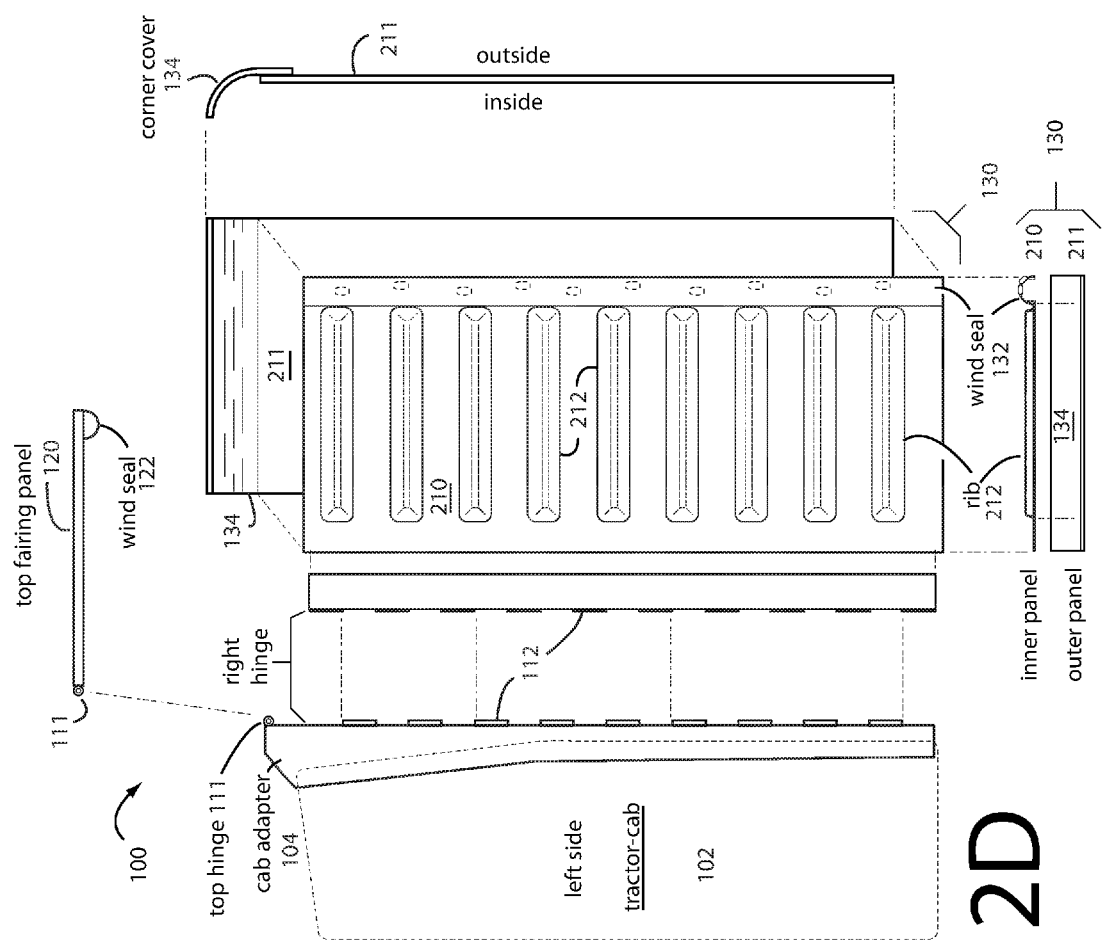
FIG. 2D is a drawing showing the left side of a left facing tractor-cab and cab adapter collar of the tractor-trailer wind fairing panel assembly of FIG. 1. And further shows an exploded view of the right side fairing panel seen from its left, and an end view of the outer part and corner cover, and an exploded bottom view of the two parts of the right side fairing panel.
Figure 2E:
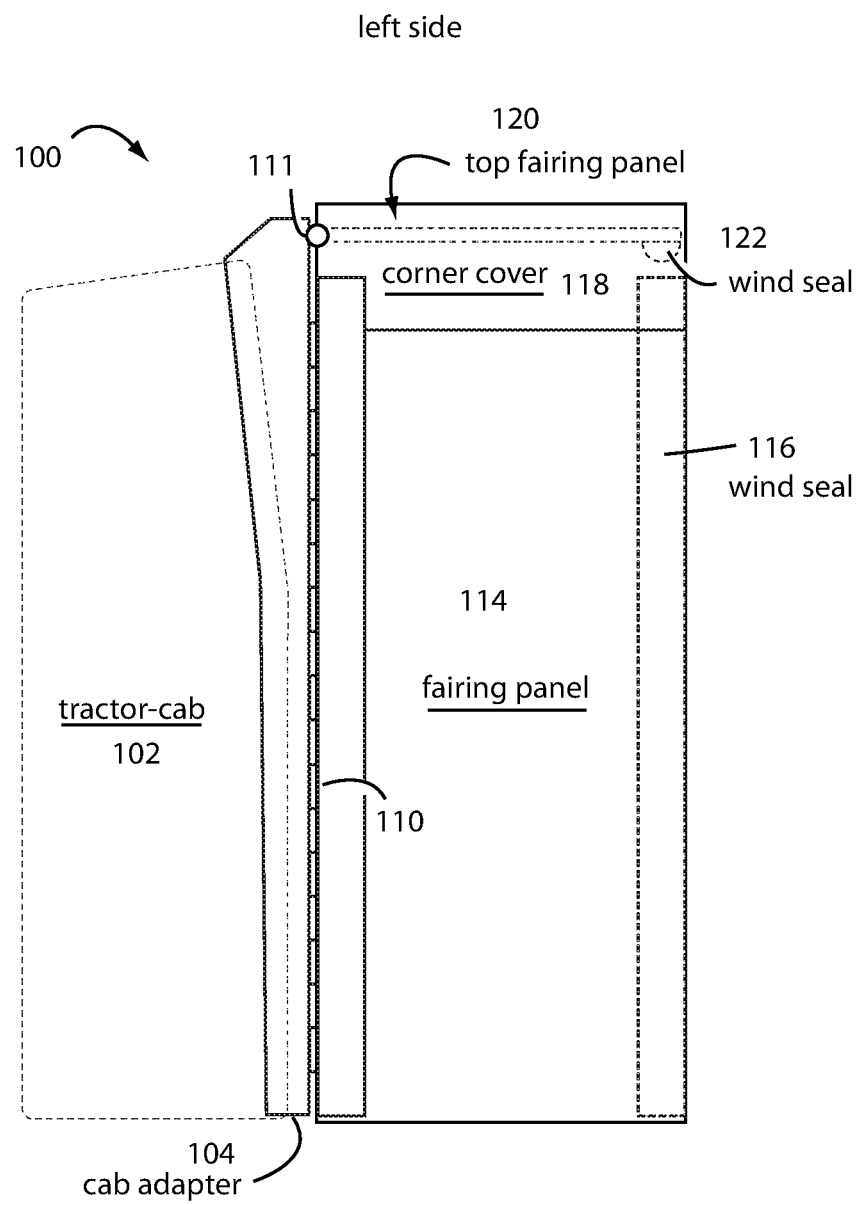
FIG. 2E is a drawing of an assembled wind fairing panel assembly of FIG. 1 as seen from the left side of a left facing tractor-cab.

A very important consideration in such construction is that the whole, and especially the fairing panels must be lightweight and yet stiff enough not to rattle and buffet in highway winds. The top and side fairing panels are therefore preferably two-ply, hollow and formed of two acrylonitrile butadiene styrene (ABS) plastic sheets 210 and 211 (as shown only in FIG. 2D). The inner sheets 210 have several stiffening ribs 212 that control panel twisting, flexing, and bowing. For example, these ribs 212 can be vacuum-formed. Other contours and shapes can also be employed to impart stiffness and strength.

FIG. 3 represents an alternative construction of a side fairing panel 300. An outer skin 302 is notched to receive a ball bearing galley access panel 304. The outer skin 302 incorporates a rollover in a curved section 306. Here, a separate corner cover 118, 134 is not used, it is integrated. A slightly shorter length inner skin 308 is welded, fastened, or otherwise joined to the outer skin 302 all along its outer periphery. A set of several reinforcing ribs 310 are disposed parallel to one another within inner skin 308.

A ball-bearing channel 312 forms a dished gallery of ball bearing pucks 314. These are set into two parallel rows of bearings 316 and 318. A single large ball bearing exposed in the center of each ball bearing puck 314 faces toward a line of contact where the side fairing panel 300 forms a sliding wind seal with a utility trailer. These ball bearing pucks 314 can comprise all plastic materials, such as nylon which has good wear resistance.

Referring now to FIG. 4, at least four brackets 400 are used to mount assembly 100 securely to cab 102 by the custom cab adapter 104, e.g., two at both sides. Each model of truck will require a customized bracket to insure the best fitment. When two such brackets 400 are used on each side, each includes a heavy piece of curved spring steel 402 captured behind a pair of removable locking pins 404 and 406. The springs 402 counteract any unwanted folding of the side fairing panels too far in and/or out while in use. But the configuration shown here still allows a user to open a side panel to access the fifth wheel coupling, air hoses, and electrical cables. Removal of such locking pins 404 and 406 lets the assembly 100 to be folded-up for storage. The brackets 400 may also use extension pieces and blocks to cover wider gaps between the truck cab and the fairing panels.

Although the present invention has been described in terms of the presently preferred embodiments, it is to be understood that the disclosure is not to be interpreted as limiting. Various alterations and modifications no doubt become apparent to those skilled in the art after having read the above disclosure. Accordingly, it is intended that the appended claims be interpreted as covering all alterations and modifications as fall within the "true" spirit and scope of the invention.

What is claimed is:

1. A tractor-trailer wind fairing panel assembly that aerodynamically bridges air gaps between truck-tractors and their fifth-wheel type trailers, comprising:
   a cab adapter collar having left and right side vertical lengths and an inter-connecting horizontal top length, and contoured on a front face to match the contours of a rear outer periphery of a drivers cab of a particular type of truck-tractor;
   a set of three continuous hinges, of which a first is disposed vertically in a rear face of the left side length of the cab adapter collar, of which a second is disposed vertically in a rear face of the right side length of the cab adapter collar, and of which a third is disposed horizontally in a rear face of the inter-connecting horizontal top length of the cab adapter collar;
   a left fairing panel pivotally hinged to the first continuous hinge and having a distal trailing-edge free to swing left-right within a limited range;
   a left-side wind seal disposed vertically along the inside of the trailing edge of the left fairing panel, and providing a line of contact between the left fairing panel and a left front side of any fifth-wheel utility trailer coupled to the truck-tractor;
   a right fairing panel pivotally hinged to the second continuous hinge and having a distal trailing-edge free to swing left-right within a limited range;
   a right-side wind seal disposed vertically along the inside of the trailing edge of the right fairing panel, and providing a line of contact between the right fairing panel and a right front side of any fifth-wheel utility trailer coupled to the truck-tractor;
   a top fairing panel pivotally hinged to the third continuous hinge and having a distal trailing-edge free to swing up-down within a limited range;
   a top-side wind seal disposed vertically along the inside of the trailing edge of the top fairing panel, and providing a line of contact between the top fairing panel and a top front part of any fifth-wheel utility trailer coupled to the truck-tractor.

2. The tractor-trailer wind fairing panel assembly of claim 1, wherein:
   the left, right, and top fairing panels are each constructed of an outer skin and an inner skin of plastic sheet material and form a hollow interior when joined together.

3. The tractor-trailer wind fairing panel assembly of claim 1, further comprising:
   a hollow gallery disposed inside each of the left-side, right-side, and top-side wind seals; and
   a number of ball bearings disposed inside each of the left-side, right-side, and top-side wind seals, and positioned to bear all contact and reduce sliding friction with said fifth-wheel utility trailer coupled to the truck-tractor.

4. The tractor-trailer wind fairing panel assembly of claim 1, further comprising:
   a set of brackets and springs arranged to press the distal edges of the left, right, and top fairing panels against any trailer coupled to the particular type of truck-tractor, and further arranged to limit the inward swings of each of the left, right, and top fairing panels to no less that that needed for any trailer coupled to the particular type of truck-tractor to press itself in between the distal ends while coupling.

\* \* \* \* \*